Oct. 14, 1941.　　　F. L. MAIN　　　2,259,074
BRAKE MECHANISM
Filed Nov. 16, 1936　　2 Sheets-Sheet 1

INVENTOR
FRANK L. MAIN
BY Whittemore Hulbert & Belknap
ATTORNEYS

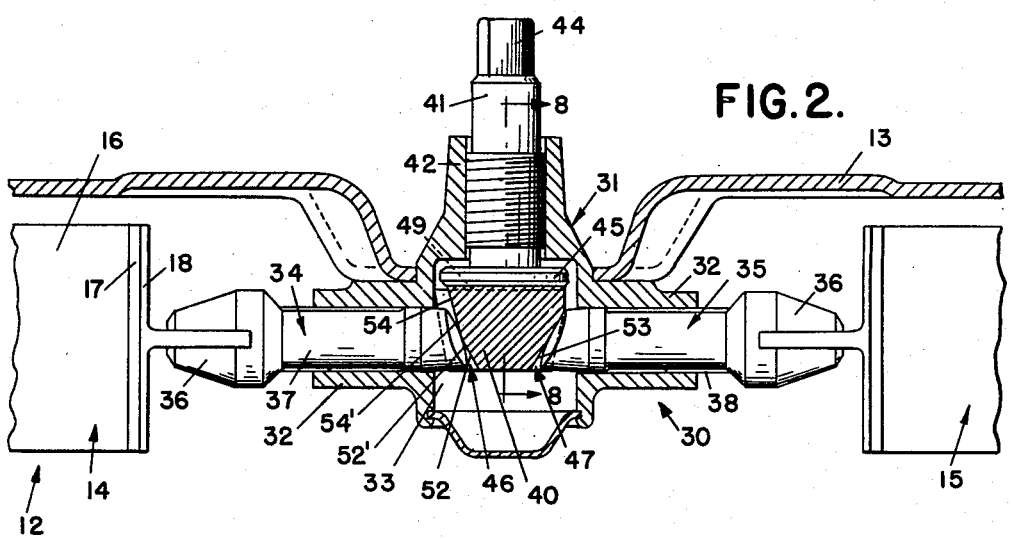

Patented Oct. 14, 1941

2,259,074

UNITED STATES PATENT OFFICE 2,259,074

BRAKE MECHANISM

Frank L. Main, Birmingham, Mich., assignor to Kelsey-Hayes Wheel Company, Detroit, Mich., a corporation of Delaware Application November 16, 1936, Serial No. 111,123

25 Claims. (Cl. 188—79.5)

This invention relates generally to brake mechanisms and refers more particularly to improved means for adjusting the brake friction means relative to the brake flange.

One of the principal objects of this invention resides in the provision of brake mechanism embodying means between the ends of the friction means at one side of the drum for adjusting the friction means and at the same time permitting full wrap of the friction means in the brake drum.

Another object of this invention consists in the provision of a brake of the shoe type wherein the secondary shoe exerts a greater braking torque than the primary shoe and wherein a single adjustment device is provided for both shoes having means for differentially adjusting the shoes to compensate for the differential wear of the latter.

A further object of this invention consists in the provision of an adjustment device embodying an axially movable member located between the ends of the shoes at one side of the drum and operable to transfer the full torque from one shoe to the other upon rotation of the drum in one direction.

The foregoing, as well as other objects, will be made more apparent as this description proceeds, especially when considered in connection with the accompanying drawings, wherein:

Figure 2 is a sectional view taken substantially on the plane indicated by the line 2—2 of Figure 1;

Figure 3 is a cross sectional view taken substantially on the plane indicated by the line 3—3 of Figure 1;

Figure 5 is an elevation of the end of the adjustment wedge engaged by the stem;

Figure 7 is a similar sectional view through still another modified form of adjusting device; and Figure 8 is a sectional view taken substantially on the plane indicated by the line 8—8 of Figure 2.

Figures 1, 4, 6:
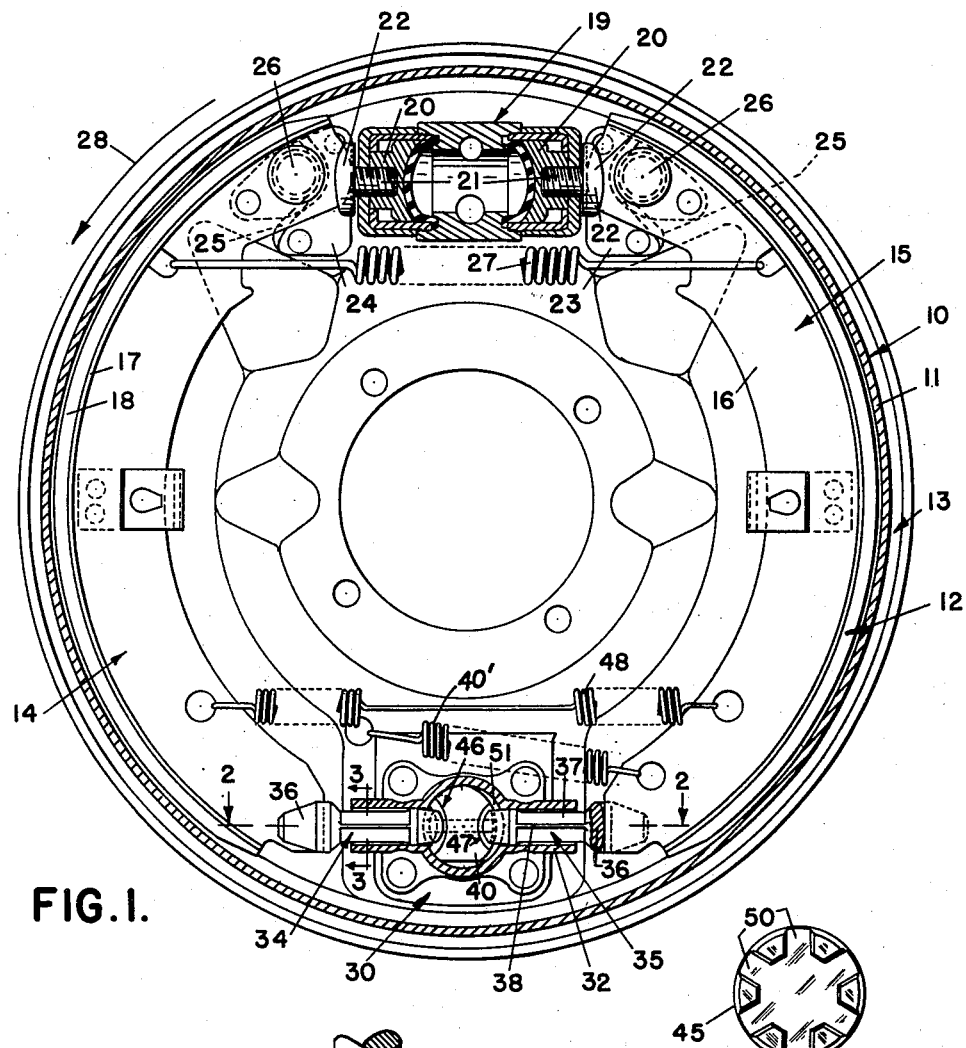
Figure 1 is a side elevational view, partly in section, of a brake constructed in accordance with this invention.
Figure 4 is an end elevation of the adjustment stem.
Figure 6 is a sectional view through a modified form of adjusting device.

In the embodiment of the invention illustrated in Figures 1 to 5, inclusive, the brake mechanism is shown as comprising a revoluble brake drum 10 having an annular brake flange 11 engageable with brake friction means 12 supported within the drum on a fixed backing plate 13. In the present instance, the brake friction means 12 comprises a pair of shoes 14 and 15 positioned in the drum with the opposite ends of one shoe spaced circumferentially from the corresponding ends of the other shoe. In accordance with conventional practice, the shoes are substantially T-shaped in cross section having web portions 16 located in a plane parallel to the plane of rotation of the drum and having a transverse head portion 17 equipped with a brake lining 18 on the outer surface thereof for engagement with the inner surface of the annular brake flange 11.

The means for moving the brake shoes radially outwardly into engagement with the brake flange 11 of the drum is supported on the backing plate 13 between the upper ends of the shoes and is constructed to permit the circumferential movement of the shoes required to afford a full wrap of the shoes. Upon reference to Figure 1, it will be noted that the actuator selected herein for the purpose of illustration is of the hydraulic type and comprises a cylinder 19 secured in any suitable manner to the backing plate 13 between the upper ends of the shoes. In the present instance, a pair of opposed pistons 20 are reciprocably mounted in opposite ends of the cylinder and are movable outwardly relative to the cylinder by fluid under pressure admitted into the latter between the pistons. It will be observed from Figure 1 that the pistons 20 carry studs 21 having enlarged heads 22 respectively engageable with the upper ends of the shoes 14 and 15 to move the latter outwardly into engagement with the brake flange 11 of the drum.

In the present illustrated embodiment of the invention, the housing 19 of the hydraulic actuator is relieved from the braking stresses by means of abutment brackets 23 and 24 secured to the backing plate 13 at opposite ends of the housing 19. The brackets are provided with axially inwardly extending flanges 25 for abutting engagement with pins 26 secured to the web portions 16 of the brake shoes adjacent the upper extremities of the latter and extending laterally inwardly from the web portions. In the free position of the brake, the pins 26 on the shoes are urged into engagement with the abutments by means of a retraction spring 27 interconnecting the upper ends of the shoes. However, since the pistons 20 in the cylinder 19 are moved outwardly by the action of the fluid pressure on the inner surfaces of the pistons, the upper ends of the shoes are engaged by the studs 22 and are moved radially outwardly relative to the abutment brackets into engagement with the brake flange of the drum. Assuming that the drum is rotating in the direction of the arrow 28 in Figure 1, the shoes will wrap or shift circumferentially of the drum in the direction of the arrow until the pin 26 on the secondary shoe 15 engages the abutment bracket 23. This shifting movement of the shoes is permitted through the actuator 19 by reason of the fact that the fluid between the pistons is relatively non-compressible and will act to transfer the movement of the primary shoe 14 to the secondary shoe 15.

The means for adjusting the brake shoes relative to the brake flange comprises a device 30 secured to the backing plate 13 between the lower ends of the shoes, and this device is constructed to permit the unlimited servo afforded by the actuator 19. Upon reference to Figure 2, it will be noted that the device 30 comprises a bracket 31 riveted, or otherwise suitably secured to the backing plate 13 and having axially aligned tubular extensions 32 located within the drum between the lower ends of the shoes. The extensions 32 are arranged at right angles to the axis of rotation of the drum, and the adjacent ends of the bores of the latter communicate with an axially extending bore 33 formed in the bracket 30. It will be observed from Figure 2 that the extensions 32 respectively slidably receive links 34 and 35 having enlarged head portions 36 at the outer ends slotted to receive the adjacent ends of the web portions 16 of the brake shoes.

In the present instance, the links are of the floating type wherein the diameter of the stem portions 37 thereof is sufficiently smaller than the internal diameter of the tubular portions 32, to permit the radially outward movement of the shoes required to secure complete frictional engagement of the linings of the shoes with the brake flange. While rocking movement of the links in a direction to afford the above results is important, nevertheless, it is also important that the brake shoes be prevented from axial shifting movement relative to the drum, and this is accomplished herein by providing diametrically opposed ribs 38 on the stems 37 of the links for engaging the opposite side walls of the tubular extensions 32.

The shoes are adjusted relative to the brake flange by a wedge 40 supported in the bore 33 of the bracket between adjacent ends of the adjustment links for movement axially of the bracket by means of a screw 41 threadedly mounted in an axial extension 42 of the bore 33. The extension 42 projects out of the brake drum through an opening in the backing plate 13 and positions the outer end of the screw for convenient manipulation. As shown in Figure 2, the outer end of the screw has a polygonally shaped portion 44 for engagement with a suitable wrench, and the inner end of the screw is provided with an enlarged head 45 adapted to abut the outer side of the wedge 40 for moving the same axially of the bore 33.

The opposite sides of the wedge 40 are provided with grooves 46 and 47, respectively, receiving the inner ends of the links 34 and 35. The bottoms of the grooves are, of course, tapered from the outer side of the wedge inwardly toward the axis of the wedge so that movement of the latter along said axis by the screw 41 will effect an outward displacement of the shoes relative to the brake flange. When making an adjustment, the shoes are moves outwardly by the wedge until the friction linings 18 on the transverse heads 17 of the shoes engage the inner surface of the annular brake flange 11, and then the screw 41 is backed off an amount equal to the desired clearance between the brake shoes and annular brake flange 11. As the adjustment screw 41 is backed off, the retraction spring 48 interconnecting the lower ends of the shoes, functions to move the shoes inwardly until the adjacent ends of the links frictionally engage the bottoms of the grooves in the wedge.

In order to provide for securing an accurate predetermined clearance between the brake shoes and brake flange and at the same time prevent accidental rotation of the adjustment screw 41, the outer face of the wedge is provided with a rib 49 successively engageable within a series of notches 50 formed in the adjacent surface of the enlarged head 45 on the adjustment screw 41. The spacing of the notches 50 is accurately predetermined so that these notches will cooperate with the rib 49 on the wedge to indicate predetermined increments of adjustment of the brake shoes relative to the brake flange. It will be observed from Figure 2 that the rib 49 extends across the outer face of the wedge in the direction of circumferential movement of the shoes and is held in this position by virtue of the engagement between the inner ends of the adjustment links with the grooves in the opposite sides of the wedge. This construction is important in that it permits shifting of the wedge in the bore 33 when the brake shoes are moved circumferentially of the brake drum.

From the above construction, it will be apparent that the wedge 40 must be capable of shifting movement in the bore 33 transversely to the axis of the latter in the direction of the arrow 28 in order for torque to be transmitted from the primary shoe 14 to the secondary shoe 15. Although various different types of constructions may be provided for effecting the desired clearance between the wedge 40 and bore 33 to accomplish the shifting movement of the wedge aforesaid, I have found that the arrangement illustrated in Figure 1 is satisfactory for this purpose. In detail, the wedge 40 is generally elliptical in cross section with the opposite sides of substantially the same radius and with one side eccentric to the other. In the specific embodiment of the invention illustrated in Figure 1, it will be noted that the side of the wedge engaged by the primary shoe 14 is substantially concentric to the bore 33 and the opposite side of the wedge adjacent the end of the secondary shoe is eccentric to the bore 33. The construction is such as to provide ample clearance, indicated in Figure 1 by the reference character 51, for unlimited servo in the direction of the arrow 28 under all conditions of brake operation. In other words, the clearance 51 is such as to permit the circumferential movement of the brake shoes required to secure a full wrap of the shoes in the direction of the arrow 28, irrespective of the co-efficient of friction of the lining employed and irrespective of variations in temperature and clearance between the shoes and brake flange. It follows, therefore, that the bracket 30 does not take any of the torque exerted by the primary shoe when the brake drum is rotating in the direction of the arrow 28, with the result that all of this torque is transferred to the secondary shoe. On the other hand, when the drum is rotating in the reverse direction, the adjustment device acts as an anchor in that the rear side of the wedge engages the adjacent side of the bore 33 in the bracket and prevents torque from being transferred from the shoe 15 to the shoe 14. It will, of course, be understood that the brake shoes are centered in the drum by engagement of the wedge 40 with the side aforesaid of the bore 33 of the bracket and is normally urged to this position by a spring 40'. As shown in Figure 1, one end of the spring is connected to the adjustment end of the secondary shoe 15 and the opposite end of the spring is secured to the backing plate at a point adjacent the adjustment end of the primary shoe 14.

With an arrangement of the above character, it will be noted that when the brake drum is rotating in the direction of the arrow 28, the secondary shoe exerts a greater braking torque than the primary shoe, and accordingly the friction lining on the secondary shoe will wear at a faster rate than the friction lining on the primary shoe. The actual difference in wear between the two linings will depend to a great extent upon the length of the lining on the secondary shoe and the co-efficient of friction of this lining, as compared to that on the primary shoe. This difference in wear between the linings on the two shoes may be compensated for to some extent by employing a shorter lining on the secondary shoe and one having a lower co-efficient of friction than the lining on the primary shoe. In addition, the secondary shoe may be adjusted at a faster rate than the primary shoe determined by the difference in the rate of wear of the linings on the two shoes. This is automatically accomplished by the wedge 40 in the following manner. Upon reference to Figure 2, it will be noted that the inner end portion 52 of the bottom of the groove 46 is inclined at the same angle as the bottom 53 of the groove 47, and the outer end portion 54 of the bottom of the groove 46 is inclined at a smaller angle. The arrangement is such that when the adjacent ends of the adjustment links engage the inner end portions 52 and 53 of the wedge, both brake shoes are correspondingly positioned relative to the adjustment device and their friction linings may be properly ground. This grinding operation is performed during the manufacture and prior to the assembly with the brake drum and backing plate. However, after assembly, axially inward adjustment of the wedge positions the latter so that the adjustment links engage the outer portions of the bottoms of the grooves. In other words, the adjustment link 34 for the primary shoe engages the portion 54 of the bottom of the groove 46, which is inclined at a smaller angle than the inclination of the portion 52 of the same groove and the bottom 53 of the groove 47. Thus, it will be apparent that axial adjustment of the wedge in an inward direction advances the adjustment link 35 for the secondary shoe at a greater rate than the adjustment link 34 for the primary shoe. The angles of the bottom 53 for the groove 47 and the portion 54 of the bottom for the groove 46 are predetermined in accordance with the approximate rate of wear of the friction linings of the secondary and primary shoes so that adjustment of the wedge compensates for the difference in wear of the friction linings on the shoes, and provides equal clearance between the friction linings and the brake flange 11 of the drum.

Attention is called to the fact at this time that the flattened end portion of the link 34 associated with the primary shoe is fashioned to provide angularly arranged inner and outer surfaces 52' and 54' complementary to the angularly disposed surfaces 52 and 54, respectively, on the bottom of the groove 46 in the wedge. With this arrangement, a gradual change of rate of adjustment of the primary shoe is effected at the zone of the junction of the two complementary angularly disposed surfaces, and this is desirable in that it prevents abrupt change in rate of adjustment of the primary shoe. If desired, the inner end of the link 35 for the secondary shoe may also be provided with a similar flattened end portion so that these links will be interchangeable and assembly of the brake, accordingly, facilitated.

Upon reference to Figure 1, it will be noted that the extremities of the upper ends of the shoes engaging the heads 22 carried by the hydraulically actuated pistons, are curved to have a rolling engagement in the radial slots formed in the head portions 22. The radius of curvature of the upper extremity of each shoe is struck from the axis of pivotal movement of the particular shoe in order to insure a contact between the extremities of the shoes and heads 22 at all times.

In the foregoing description, reference has been made to the fact that the members 21 having the enlarged heads 22 are threaded in the pistons 20. If desired, the members 21 may merely have a sliding fit in the recesses formed in the outer ends of the pistons 20, since the actuator 19 rotates with the shoes upon adjustment of the latter and, as a consequence, no change takes place between the upper ends of the shoes and actuator. Thus, the adjustment provided by threading the members 21 in the recesses provided in the pistons is not necessary. However, I prefer to provide such an adjustment for the following reasons:

1. To insure contact of the enlargements 22 with the upper extremities of the shoes, irrespective of manufacturing inaccuracies;

2. To prevent rotation of the members 21 in the assembly and thereby maintain the radial grooves in the heads 22 in a position to receive the upper extremities of the shoes; and 3. To compensate for the wear on the upper extremities of the shoes by adjusting the members 21. This feature is of particular importance in constructions where the actuator ends of the shoes are not hardened to prevent upsetting under torque.

In view of the fact that in a full wrapping brake of the character previously set forth, the region of greatest differential wear between the linings of the two shoes is more or less concentrated at the ends of the shoes adjacent the actuator and is practically the same at the adjustment ends of the shoes, it is possible to eliminate the compound angle of the bottom of the groove receiving the link for the primary shoe. In Figure 6 of the drawings, I have shown an adjusting device wherein both the primary and secondary shoes are adjusted at the same rate by a device identical to the one shown in Figures 1 to 5, inclusive, with the exception that the bottoms 60 and 61 of the grooves on opposite sides of the wedge are inclined at the same angle with respect to the axis of the wedge. The flattened inner ends of the adjustment links are correspondingly inclined and engage the bottoms to move the shoes outwardly when the wedge is adjusted axially of the bracket in an inward direction.

The embodiment of the invention shown in Figure 7 differs from the one described in the first form of this invention in that the adjustment links 62 and 63 for the primary and secondary shoes 14' and 15' are not of the floating type. As shown in Figure 7, the links have a sliding fit with the bores of the tubular extensions 64 of the adjustment bracket 65 and, as a consequence, introduces a resistance to the transfer of torque from the primary shoe to the secondary shoe. This resistance when added to the resistance offered to sliding movement of the wedge across the face of the enlarged end 66 of the adjusting screw, appreciably reduces the tendency of the brake to grab at relatively light pedal pressures. With the above exception, the embodiment of the invention shown in Figure 7 may be identical in construction and operation to the one described in connection with Figures 1 to 5, inclusive.

While several different constructions have been selected for the purpose of illustrating this invention, nevertheless, it will be noted that each of the embodiments render it possible to employ all of the available servo when the brake drum is rotating in a forward direction. In addition, it will be apparent that in each of the constructions, a single adjustment device is provided for adjusting both of the brake shoes and in certain instances operates to provide a greater rate of adjustment of the secondary shoe than the primary shoe in order to compensate for the different rates of wear of these two shoes.

What I claim as my invention is:

1. In a brake mechanism, a brake drum, brake shoes supported within said drum for movement circumferentially of the drum and having the ends at one side of the drum spaced from each other, an adjustment device for the shoes, said device having a wedge supported between said ends of the shoes for movement circumferentially of the drum as a unit with the shoes the extent required for the full torque to be transferred through the wedge from one shoe to the other and having means effective upon axial movement of the wedge in one direction to differentially adjust the shoes, and means accessible from a point exteriorly of the drum for axially moving said wedge.

2. In a brake mechanism, a brake drum, brake shoes supported within said drum for movement circumferentially of the drum and having the ends at one side of the drum spaced from each other, an adjustment device for the shoes located between said ends, said device having a bracket provided with an axially extending bore, and a wedge supported within the bore between the ends of the shoes for axial movement relative to the bore and having sufficient clearance in the bore to provide for shifting movement of the wedge circumferentially of the drum as a unit with the shoes the extent required for the full torque to be transferred through the wedge from one shoe to the other.

3. In a brake mechanism, a brake drum rotatable in one direction, brake shoes supported within said drum for movement circumferentially of the drum and having the ends at one side of the drum spaced from each other, an adjustment device for the shoes located between said ends, said device comprising a bracket having an axially extending bore, a wedge member supported within the bore for axial movement relative thereto and having the side opposite the direction of rotation of the drum engageable with the adjacent side of the bore in the released position of the shoes, the opposite side of the wedge being spaced from the bore a sufficient distance to permit the full torque to be transferred through the wedge from one shoe to the other.

4. In a brake mechanism, a brake drum rotatable in one direction, brake shoes supported within said drum for movement circumferentially of the drum and having the ends at one side of the drum spaced from each other, an adjustment device for the shoes located between said ends, said device having a bracket provided with an axially extending bore, a wedge member supported within the bore between said ends of the shoes for axial movement, said wedge member having sufficient clearance between the leading side thereof and the adjacent side of the bore to provide for transferring the full torque from one shoe to the other when the drum is rotating in the above mentioned direction and also having provision for differentially adjusting the shoes in accordance with the difference in wear of the shoes resulting from the transfer of the full torque from one shoe to the other.

5. In a brake mechanism, a brake drum, brake shoes supported within said drum for movement circumferentially of the drum and having the ends at one side of the drum spaced from each other, an adjustment anchor device for said shoes located between said ends, said device comprising a bracket, links guided by the bracket and operatively connected to said ends of the shoes, an axially adjustable wedge supported by the bracket between the adjacent ends of the links for movement circumferentially of the drum as a unit with the shoes the extent required for the full torque to be transferred through the wedge from one shoe to the other, and a rotatable member for axially moving said wedge.

6. In a brake mechanism, a brake drum, brake shoes supported within said drum for movement circumferentially of the drum and having the ends at one side of the drum spaced from each other, an adjustment anchor device for said shoes located between said ends, said device comprising a bracket, links guided by the bracket and operatively connected to said ends of the shoes, an axially adjustable wedge supported by the bracket between the adjacent ends of the links for movement circumferentially of the drum as a unit with the shoes the extent required for the full torque to be transferred through the wedge from one shoe to the other and having means effective upon axial movement of the wedge in one direction to differentially adjust the shoes, and a rotatable member for axially moving said wedge.

7. In a brake mechanism, a brake drum, brake shoes supported within said drum for movement circumferentially of the drum and having the ends at one side of the drum spaced from each other, an adjustment device for the shoes located between said ends, said device comprising a bracket having axially aligned tubular portions spaced from each other in the direction of circumferential movement of the shoes, links supported within the tubular portions and frictionally engageable with the inner walls of the tubular portions throughout the area of said walls, the outer ends of said links being operatively connected to said ends of the shoes, an axially adjustable wedge supported by the bracket between the inner ends of the links for movement circumferentially of the drum as a unit with the shoes the extent required for the full torque to be transferred through the wedge from one shoe to the other.

8. In a brake mechanism, a brake drum, brake shoes supported within said drum for movement circumferentially of the drum and having the ends at one side of the drum spaced from each other, an adjustment device for said shoes located between said ends, said device comprising a bracket having an axially extending bore therein and having aligned tubular extensions projecting from opposite sides of the bore, links telescopically engaging within the extensions and having the outer ends operatively connected to said ends of the shoes, an axially adjustable wedge supported in the bore of the bracket between the inner ends of the links for movement circumferentially of the drum as a unit with the shoes the extent required for the full torque to be transferred through the wedge from one shoe to the other, and means accessible for manipulation from a point exteriorly of the drum and frictionally engaging the outer surface of the wedge for adjusting the latter axially of the bore in said bracket.

9. In a brake mechanism, a brake drum having a forward and reverse direction of rotation, brake shoes supported within said drum for movement circumferentially of the drum in the forward direction of rotation thereof and having the ends at one side of the drum spaced from each other, an adjustment device for the shoes, said device embodying an axially movable wedge supported between said ends of the shoes for circumferential movement with the shoes in the forward direction of rotation of the drum the extent required for the full torque to be transferred from the end aforesaid of the leading shoe to the adjacent end of the trailing shoe, said wedge also having means responsive to axial movement of the wedge in one axial direction relative to the shoes to adjust the trailing shoe at a faster rate than the leading shoe.

10. In a brake mechanism, a brake drum, brake friction means supported within said drum for movement circumferentially of the drum and having spaced ends, an adjustment device for the friction means, said device embodying an axially movable wedge supported between said ends of the friction means for movement in one direction circumferentially of the drum as a unit with the friction means the extent required for the full torque to be transferred through the wedge, a member fixed against movement with the wedge and engageable with the side of the wedge opposite the direction of shifting movement of said wedge to anchor the friction means in the opposite direction, and yieldable means normally urging the wedge into engagement with said member.

11. In a brake mechanism, a brake drum revoluble in opposite directions, brake shoes supported within said drum for movement circumferentially of the drum and having the ends at one side of the drum spaced from each other, an adjustment device for the shoes, said device embodying an axially movable wedge supported between the ends of the shoes for shifting movement as a unit with the shoes in the forward direction of rotation of the brake drum the extent required for the full torque to be transferred through the wedge from the leading shoe to the trailing shoe, a member fixed against movement with the wedge and engageable with the side of the wedge facing the adjustment end of the leading shoe to center the shoes in said drum, and yieldable means normally urging the wedge into engagement with said member.

12. In a brake mechanism, a brake drum having a forward direction of rotation, brake shoes supported within said drum for movement circumferentially of the drum in the direction of forward rotation thereof and having the ends at one side of the drum spaced from each other, an adjustment device for the shoes located between said ends, said device comprising a bracket having an axially extending bore, a wedge member movable axially in the bore and effective upon axial movement in one direction to adjust the brake shoes relative to the brake drum, said wedge member also capable of shifting movement relative to the bore in the forward direction of rotation of the drum the extent required to transfer the full torque from the leading shoe to the trailing shoe, and yieldable means normally urging the wedge into engagement with the side of the bore adjacent the adjustment end of the leading shoe.

13. A brake having shoes provided with a shiftable connection including a pair of plungers arranged end to end and engaging the shoes respectively, means for guiding said plungers, and a member between the adjacent ends of said plungers, said member and said ends having surfaces in wedging engagement and with the surface on one plunger at a different angle from that on the other, so that crowding said member between said surfaces wedges the shoes apart with one moved further than the other, in combination with means carried by the guiding means and operable to crowd said member between said plungers, said guiding means having means for limiting the shifting of said member in one direction with the plungers.

14. In brake adjusting means, a housing having a cylindrical chamber therein and openings in portions of its side walls, a wedge head movably arranged in the chamber, said head being of general elliptical shape in cross section and having opposite arcuate sides of like radius, one eccentric to the other and the rear side being concentric to the chamber and the other side eccentric to the chamber and said sides having sloping recesses therein and brake shoe studs passing through the openings in the chamber wall and having the inner ends engaging the recesses.

15. Means for adjusting the shoes of brake mechanism comprising a housing having a cylindrical chamber therein and oppositely arranged sleeves extending from the sides of the chamber, studs connected with the shoes and slidably arranged in the sleeves and having their inner ends beveled, a wedge head movably arranged in the chamber and having oppositely arranged recesses therein provided with sloping walls engaging the beveled ends of the studs, means for adjusting the head longitudinally in the chamber, said head being of general elliptical shape in cross section and having opposite arcuate sides of like radius and one eccentric to the other, the rear side being concentric to the cylindrical chamber and the other eccentric to the cylindrical chamber, the latter side being the forward side of the head.

16. Means for adjusting the shoes of brake mechanism comprising a housing having a cylindrical chamber therein and oppositely arranged sleeves extending from the sides of the chamber, studs connected with the shoes and slidably arranged in the sleeves and having their inner ends beveled, a wedge head movably arranged in the chamber and having oppositely arranged recesses therein provided with sloping walls engaging the beveled ends of the studs, means for adjusting the head longitudinally in the chamber, said head being of general elliptical shape in cross section and having opposite arcuate sides of like radius and one eccentric to the other, the rear side being concentric to the cylindrical chamber and the other eccentric to the cylindrical chamber, the latter side being the forward side of the head, the said adjusting means including a threaded shank in the housing having a tool engaging end projecting from the housing, the other end having a head thereon provided with radial grooves and the inner end of the wedge head having a diametrically arranged rib for fitting in the grooves.

17. Means for adjusting the shoes of brake mechanism, comprising a housing having a cylindrical chamber therein and sleeves extending from the sides of the chamber, studs connected with the shoes and slidably arranged in the sleeves and having their inner ends beveled, a wedge head movably arranged in the chamber and having recesses therein provided with sloping walls engaging the beveled ends of the studs, means for adjusting the head longitudinally in the chamber, said head being of general elliptical shape in cross section and having opposite arcuate sides of like radius and one eccentric to the other, the rear side being concentric to the cylindrical chamber and the other eccentric to the cylindrical chamber, the latter side being the forward side of the head, a spring connecting the adjustment end of the forward shoe with a stationary part of the brake mechanism and effective to normally urge the rear side of the wedge into abutting engagement with the adjacent side of the chamber.

18. Means for adjusting the shoes of brake mechanism, comprising a housing having a cylindrical chamber therein and sleeves extending from the sides of the chamber, studs connected with the shoes and slidably arranged in the sleeves and having their inner ends beveled, a wedge head movably located in the chamber and having recesses in its sides provided with sloping walls engaging the beveled ends of the studs, a shank in the housing, means for adjusting the shank longitudinally in the housing, a head on the shank having radial grooves therein and the inner end of the wedge head having a rib for engaging said grooves, said head being of general elliptical shape in cross section and having opposite arcuate sides of like radius, one eccentric to the other, the rear side being concentric to the cylindrical chamber and the other eccentric to the cylindrical chamber, and spring means for holding the parts in neutral position, with the concentric rear side of the head in engagement with the rear part of the chamber wall.

19. Means for adjusting the shoes of brake mechanism, comprising a housing having a cylindrical chamber therein and sleeves extending from the sides of the chamber, studs connected with the shoes and slidably arranged in the sleeves and having their inner ends beveled, a wedge head movably located in the chamber and having recesses in its sides provided with sloping walls engaging the beveled ends of the studs, a shank in the housing, means for adjusting the shank longitudinally in the housing, a head on the shank having radial grooves therein and the inner end of the wedge head having a rib for engaging said grooves, said head being of general elliptical shape in cross section and having opposite arcuate sides of like radius, one eccentric to the other, the rear side being concentric to the cylindrical chamber and the other eccentric to the cylindrical chamber, spring means for holding the parts in neutral position, with the concentric rear side of the head in engagement with the rear part of the chamber wall, said rib being substantially horizontally arranged and the recesses being arranged substantially opposite each other in a horizontal plane.

20. In a brake mechanism, a brake drum, brake friction means supported within the drum for movement circumferentially of the drum in one direction from the released position thereof, means for adjusting the brake friction means supported between adjacent ends of the friction means for circumferential movement with the latter in the aforesaid direction, and a positive stop engageable with said adjusting means in the released position of the friction means to prevent shifting movement of the friction means from the released position thereof in a direction opposite the direction of shifting movement aforesaid.

21. In a brake mechanism, a brake drum, brake friction means supported within the drum for circumferential movement in one direction from the released position thereof, means for adjusting the friction means including a member supported for longitudinal movement between adjacent ends of the friction means and also supported for circumferential movement with the friction means in the aforesaid direction, a positive stop engageable with said member in the released position of the friction means to centralize the latter in the drum, and means for urging the friction means to the released position thereof.

22. In a brake mechanism, a brake drum, brake friction means supported within the drum for circumferential movement in one direction from the released position of the friction means and also supported for radial movement, means for adjusting the friction means including a member supported between adjacent ends of the friction means for longitudinal movement and for circumferential shifting movement with the friction means in the aforesaid direction, means operatively connecting said member to said ends of the friction means providing for radial movement of the latter, and a positive stop located to engage the adjustable member in the released position of the friction means to centralize the latter in the drum and to prevent circumferential movement of the friction means from the released position thereof in a direction opposite the direction of shifting movement aforesaid.

23. In a brake mechanism, a brake drum, brake friction means supported within the drum for circumferential movement in one direction from the released position thereof, means for adjusting the friction means including a bracket fixedly supported between adjacent ends of the friction means and having an axially extending bore, a wedge mounted in the bore for movement axially thereof to adjust the friction means and movable transversely of the bore in one direction of the friction means from the released position of the latter, and yieldable means reacting through the friction means to normally urge the latter in the opposite direction in a position wherein the side of the wedge opposite the leading end of the friction means is in abutting engagement with the adjacent side of the bore.

24. In a brake mechanism, a brake drum, brake friction means supported within the drum for circumferential movement from the released position thereof in one direction and for radial movement, means for adjusting the brake friction means including a bracket fixedly supported between adjacent ends of the friction means and having an axially extending bore, a wedge mounted in the bore for movement axially thereof and also movable transversely of the bore from the released position of the friction means in the aforesaid direction, means operatively connecting opposite sides of the wedge to the adjacent ends of the shoes providing for radial movement of the latter, and yieldable means urging the friction means in a circumferential direction opposite the one aforesaid to normally maintain the side of the wedge adjacent the leading end of the friction means into abutting engagement with the adjacent side of the bore through the bracket.

25. In a brake mechanism, a brake drum, brake friction means supported within said drum for circumferential movement in one direction from the released position thereof, means for adjusting the brake friction means supported between the adjacent ends of said means, including an axially movable member supported for circumferential movement with the shoes in the aforesaid direction, a positive stop engageable with the adjustable member in the released position of the friction means to centralize the latter in the drum, and means for retracting the adjacent ends of the friction means upon releasing the brake, said means effective to exert a preponderance of force on the friction means in the second named direction to normally effect engagement of the adjustable member with the stop.

FRANK L. MAIN.